(12) United States Patent
Norris, III

(10) Patent No.: US 10,235,042 B2
(45) Date of Patent: Mar. 19, 2019

(54) SPACE OPTIMIZING MICRO KEYBOARD METHOD AND APPARATUS

(71) Applicant: Forbes Holten Norris, III, Princeton, NJ (US)

(72) Inventor: Forbes Holten Norris, III, Princeton, NJ (US)

( * ) Notice: Subject to any disclaimer, the term of this patent is extended or adjusted under 35 U.S.C. 154(b) by 60 days.

(21) Appl. No.: 14/776,742

(22) PCT Filed: Mar. 18, 2014

(86) PCT No.: PCT/US2014/031121
§ 371 (c)(1),
(2) Date: Sep. 15, 2015

(87) PCT Pub. No.: WO2014/146131
PCT Pub. Date: Sep. 18, 2014

(65) Prior Publication Data
US 2016/0034181 A1    Feb. 4, 2016

Related U.S. Application Data

(60) Provisional application No. 61/799,004, filed on Mar. 15, 2013, provisional application No. 61/853,575, filed on Apr. 6, 2013.

(51) Int. Cl.
*G06F 3/0488* (2013.01)
*G06F 3/0484* (2013.01)
*G06F 3/023* (2006.01)
*G06F 3/0489* (2013.01)
*G06F 17/27* (2006.01)

(52) U.S. Cl.
CPC ........ *G06F 3/04886* (2013.01); *G06F 3/0236* (2013.01); *G06F 3/0237* (2013.01); *G06F 3/04842* (2013.01); *G06F 3/04897* (2013.01); *G06F 17/276* (2013.01)

(58) Field of Classification Search
None
See application file for complete search history.

(56) References Cited

U.S. PATENT DOCUMENTS 5,835,635 A * 11/1998 Nozaki ................. G06K 9/723
                                                   382/226
7,177,797 B1 * 2/2007 Micher ................. G06F 17/276
                                                   704/1

(Continued)

*Primary Examiner* — Daniel J Colilla
(74) *Attorney, Agent, or Firm* — Alig Patent Law; Graham Casanova Alig

(57) ABSTRACT

A method and apparatus is disclosed for entering text on a computer screen with a virtual keyboard and limited space, such as would be found on a mobile device such as smartphone, tablet, handheld computer or an automobile dashboard, or an appliance with a small screen. The method requires a sequence of events in which text is selected on the virtual keyboard, and a last key selected generates a new limited set of responsive keys, potentially based on word completion word fragments, for display on the screen, allowing responsive keys to be dynamically larger, variable in shape, or positioned on the virtual keyboard based on priority and availability of adjacent space to maximize the ease of use of the highest priority responsive keys. The user selects one of the responsive keys to partially complete or complete text entry.

9 Claims, 21 Drawing Sheets

(56) References Cited

U.S. PATENT DOCUMENTS

| | | | |
|---|---|---|---|
| 7,372,454 B2 | 5/2008 | Betts-LaCroix | |
| 7,886,233 B2 | 2/2011 | Rainisto et al. | |
| 8,185,841 B2 | 5/2012 | Rainisto | |
| 8,719,724 B2 | 5/2014 | Kawalkar | |
| 9,122,672 B2 | 9/2015 | Griffin et al. | |
| 2007/0046641 A1* | 3/2007 | Lim | G06F 3/04886 345/173 |
| 2009/0193334 A1 | 7/2009 | Assadollahi | |
| 2010/0225599 A1* | 9/2010 | Danielsson | G06F 3/0237 345/173 |
| 2012/0036469 A1* | 2/2012 | Suraqui | G06F 3/04883 715/773 |
| 2013/0002553 A1* | 1/2013 | Colley | G06F 3/0236 345/161 |
| 2013/0120266 A1 | 5/2013 | Griffin et al. | |
| 2013/0205242 A1* | 8/2013 | Colby | G06F 3/0482 715/773 |
| 2015/0082229 A1* | 3/2015 | Ouyang | G06F 3/04883 715/773 |
| 2015/0089435 A1* | 3/2015 | Kuzmin | G06N 5/003 715/773 |
| 2017/0139559 A1* | 5/2017 | Colby | G06F 3/0236 |
| 2017/0199665 A1* | 7/2017 | Zhai | G06F 3/04886 |
| 2017/0206193 A1* | 7/2017 | Bi | G06F 17/276 |

* cited by examiner

SPACE OPTIMIZING MICRO KEYBOARD METHOD AND APPARATUS

CROSS REFERENCE TO RELATED APPLICATIONS

This application claims priority to provisional applications No. 61/799,004, filed Mar. 15, 2013, and 61/853,575 filed Apr. 6, 2013, and international application PCT/US2014/031121 filed Mar. 18, 2014, the entire contents of each of which are incorporated herein by reference.

TECHNICAL FIELD

This invention pertains to the entry of text on computer screens having a virtual keyboard and limited screen space, for example as would be found on a handheld computer, smartphone, or automobile dashboard.

BACKGROUND OF THE INVENTION

Virtual keyboards are a text input method employed on computer screens used as computer user interfaces, in which the computer renders an image of a keyboard, and the user selects "keys" directly from image of the key. Virtual keyboards may rely on touch screens, in which the user touches the screen with a finger or a stylus, but other virtual keyboards are possible, relying on mouse key selections, eye movements, or other actions taken by a user to select a key on a virtual keyboard. Thus, virtual keyboards do not have actual physical keys with a physical switch, as in a conventional computer keyboard, but rely entirely on the touching of the screen or other selection method to select the key desired by the user. Each "key" on a virtual keyboard is nothing more than a region on a screen that is selectable.

Virtual keyboards are commonplace in a plethora of devices, including smartphones, tablet computers, automobile dashboards, industrial equipment, and home appliances.

Virtual keyboards are often presented in the traditional "QWERTY" format, but alternative keyboard layouts have been developed, and can be readily implemented using a virtual keyboard.

A typical feature of virtual keyboards, regardless of the device, is that virtual keyboards are usually employed in situations involving devices with rigid space limitations. Prime examples are smartphones or other handheld computers, in which small physical size is a critical attribute. Such small size creates challenges in entering and displaying text and graphics.

A common issue with virtual keyboards on small screens is that the small keys are hard to see and accurately select, make typing slow, tedious, difficult, and highly error prone.

However, even if a virtual keyboard is not presented on a highly space constrained device, typing and data entry on a virtual keyboard is usually more difficult than a conventional full size keyboard. There is a lack of tactile feedback and other cues present on conventional keyboards, which makes typing even on a larger virtual keyboard slow, difficult, and error prone.

Computer makers on devices such as smartphones have addressed this issue with various methods for predictive word completion systems. One such method is disclosed in U.S. Pat. No. 7,886,233, (the '233 patent) which discloses various menus that appear when text is typed that guesses what the user might want to say.

Typically, such systems start with two computer screen regions. A lower region displays the virtual keyboard, and an upper region displays edit content, such as a text message, email message, or other document.

The '233 patent discloses a typical prior art embodiment for predictive word completion in which a third region is rendered between the virtual keyboard and edit content regions of the screen that displays (typically in a single line) several word completion options. See, for example FIG. 10 in the '233 patent. The '233 patent itself discloses word completion candidates or fragments thereof that appear in the area that would otherwise be used by the virtual keyboard space bar (FIG. 11 and col. 9, 1 40).

Another prior art approach is shown in U.S. Pat. No. 6,002,390, in which substantial menus showing word completion candidates are displayed.

SUMMARY OF THE INVENTION

This invention discloses methods and apparatus that transform normal keyboards into highly dynamic menu systems where keyboard layouts and key labels are high flexible and can change and adapt to provide users the largest possible keys on a keystroke by keystroke basis. A limited set of keys is generated dynamically to generate keys optimizing the space, size, and visibility of each key.

Traditional keyboards display full and extensive sets of letters and symbols, creating significant usage problems on small screens; by contrast, this invention filters and strips these down to bare essential keys, thus creating a dynamically changing keyboard menu system, designed to selectively optimize size and ease of use of each menu of keys. Thus, in an embodiment, this invention provides a method and apparatus for word completion during text input by a user on a computer apparatus (300) having a virtual keyboard user interface (303), in which the user interface has limited screen space (301) to display the virtual keyboard and any other information (302). The method and apparatus employ a sequence in which the user enters text by selecting keys on the virtual keyboard for one or more letters comprising a partial word, wherein each partial word has a "last letter key," which is the last key (in time) selected by the user. This last key need not be the final key in a word, or word fragment. Thus, the last letter key includes letter that are embedded within a word or word fragment.

The next step in the sequence of this embodiment is that the user is presented with a computer generated set of keys on the virtual keyboard in response to the last letter key, called "responsive keys." The responsive keys are prioritized by some method, which may include statistical occurrence of such letters, or may be based on some other rational context, such as locations of nearby features on a map.

There may be a computer generated means to adjust the appearance of the responsive keys into uniform or non-uniform shapes dynamically variable in size, shape, or position on the virtual keyboard based on priority and availability of adjacent space to maximize the ease of use of the highest priority responsive keys.

A final step of the method or apparatus in this embodiment is that the user selects one of the responsive keys to partially complete or complete a word.

In another embodiment, a computer implemented menu generation system is provided, based on word trees.

DETAILED DESCRIPTION OF THE INVENTION

Figure 1:
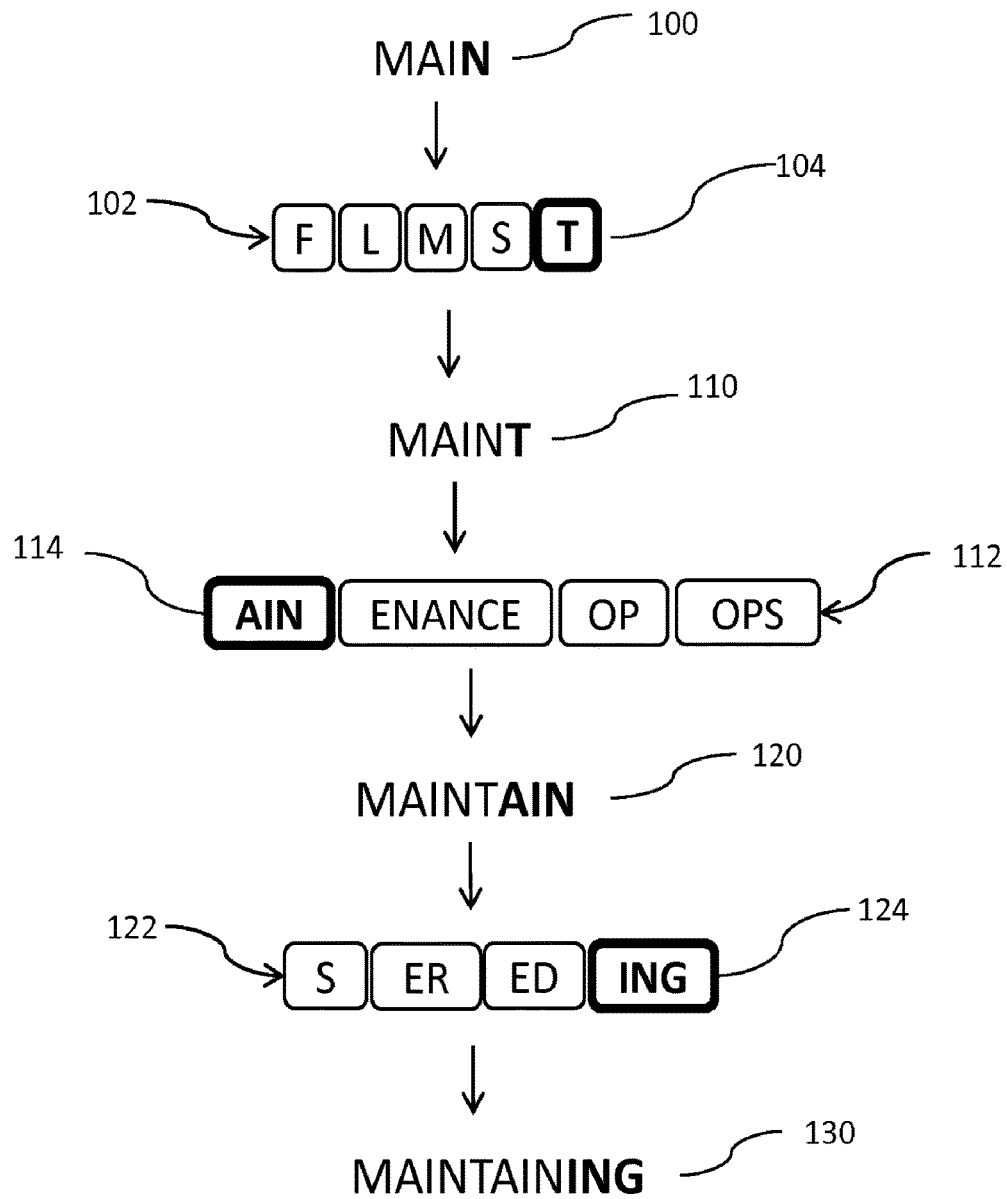
FIG. 1 shows the inventive word tree systems.

This invention describes methods and apparatus that are particularly adapted for use on space constrained virtual keyboards, such as are used on smart phones, compact handheld computers, automobile dashboards, and other applications where cost or physical limitations (for example, the need to hold a device in a human hand) limit the screen space available. Such space constrained devices present challenges in the efficient entry of text and data. However, the inventive methods and apparatus are not limited to space constrained keyboards, and can also be valuable in larger devices to expedite text entry in certain situations.

Traditional prior art keyboards typically have these features:

Static layout (e.g. QWERTY)

Relatively single mode of operation display of the entire alphabetical letter set at all times single letter keys uniform key size and symmetric shape.

Few if any additional modes of operation, which if present, generally require manual switching In an embodiment, the instant invention provides modified keyboards, particularly suited to virtual keyboard computer interfaces, in which word fragment keys can be rendered showing one or more letters, in non-standard shapes and modified locations on the region of the screen used as the virtual keyboard. Additionally, this invention may only display keys relevant to specific word completion scenarios. In another embodiment, key size and shape can be dynamically determined. In another embodiment, various modes of operation can changed automatically based on the appropriate context. By the phrase "modes of operation," it is meant that different modes can be displayed as the context requires, for example, switching from a standard QWERTY display to a spring loaded mode displaying a limited number of keys, as is more fully described herein.

All features of this invention can be dynamically responsive to very specific word completion scenarios on a keystroke by keystroke basis.

During text entry, words can be constructed from a sequence of word fragments, where a word fragment is defined in this context as one or more letters, which function as building blocks of longer words, where fragments themselves can even be complete words.

Traditional keyboards, such as having a "QWERTY" layout, use a static layout of single letter (fragment) key input to construct words, thus requiring an entire alphabet of keys. However, word fragments longer than one letter reduce the number of key presses required to enter desired text, and require fewer keys and less space.

In the inventive method, a database is constructed comprising trees of words emanating from a root word fragment. This database is constructed in advance. Such databases actually exist, and can be accessed for example, at http://www.scrabblefinder.com/starts-with/xxx/ (where "xxx" represents a root word fragment). A root word fragment can be a complete word, like "main." But even a complete word like "main" can also be a root fragment for longer words, for example "maintain."

Each branch in the word tree database terminates in a node that is a suffix fragment that can be combined with the root word fragment. In some cases, the combined root and suffix make a complete word. Regardless of whether the combined root and suffix make a complete word, the combined root and suffix can be used as a child root fragment in the word tree database that leads to a subset of branches, narrowing the choices of complete words that can be generated as the root grows in size.

In the inventive method, the typing (data entry) of words can be visualized as navigating or walking down the branches of a word completion tree, via a menu of fragment choices.

A much more compact form of this type of tree has branch leaf nodes representing word fragments, where "word fragment" or just "fragment" is defined in this context as one or more letters, which function as pieces or building blocks of longer words, where fragments themselves can even be complete words. For example the word "MAINTAINING" can be formed from the fragment sequence "MAIN" "T", "AIN", "ING".

An example is seen in FIG. XX, where the fragment "MAINT" has branch node fragment completion options "AIN," "ENANCE," "OP," and "OPS" (element 100).

The starting fragment of each word forms the root parent node of a word completion tree, with branch leaves represented by child fragment nodes.

Each node can be the parent of child nodes extending downwards another branch level. This branching pattern is repeated downwards until all possible words deriving from the starting root node fragment are represented, where terminal nodes (those lacking child nodes) represent the final fragments of complete words.

Thus each letter or fragment in a word represents a node in a word completion tree, where each node represents a fragment building block suffix that is incrementally added to a prefix of prior fragments in the node branch navigation path. Each partial node path forms a new incremental word fragment representing the start or root building block of still longer words.

As words are typed, each additional letter or fragment entered greatly reduces the number of relevant next letters or fragments choices, particularly after just the first 3 starting letters of most words.

Each node's child node group effectively represents a set of unique menu keys, each providing a potential building block suffix to the current word being edited.

Word Tree Database

This invention requires a computer method and database containing the entire vocabulary of words derivable from a common word fragment prefix. Any possible word fragment, or database node, may be connected by branches to other word fragments, or child nodes. The only instances in which there is no further child node connection is at the termini of branches, where no child nodes are possible. In such cases, the terminal nodes are complete words that are not fragments of other longer words. The combination of a parent node and a child node is either a complete word (at the terminus of a branch), or a longer valid word fragment that gives rise to a subset of further children branches and nodes.

In a preferred word completion tree embodiment, each fragment's child node fragments, where possible, are chosen for maximum flexibility, meaning factors like brevity and minimum character length, resulting in fewer non-terminal nodes, and bigger trees with richer branch structure.

In a preferred embodiment of each word completion tree, each node fragment is a suffix added to the sum of all ancestor node fragments traversed in a descending path starting from the tree root node fragment.

Each node fragment can be the end of a branch from which no additional child nodes with that parent node fragment embedded are possible. Alternatively, a node has a set of one or more branches emanating from it leading to unique child node fragments from which longer words can be built.

Node fragments preferably have maximum flexibility, based on factors such as brevity and minimum character length. This results in fewer non-terminal nodes, providing fragments which tend to provide word completion building blocks, rather than full word completion endings.

Thus trees are built from a set of the most common intermediate step fragments, resulting in a rich branch structure, which compared to conventional methods, provides faster, more convenient branch navigation to every possible word derivable from any root or node fragment anywhere in the tree.

For example "MAIN" is both a word, but also the beginning root word fragment of approximately 35 other words, all deriving from any of the letters F, L, M, S, T appended to the end of "MAIN."

For example, if the letter T is selected as the next letter in the sequence, a new parent word fragment root is "MAINT," from which about nine possible child words may be derived from any of just four letter/word fragments menu choices: "AIN," "ENANCE," "OP," and "OPS."

An important benefit of this approach is that it allows maximum flexibility in constructing long and complex words from small fragment building block suffixes.

Another important benefit to this approach is a greatly reduced key set required, particularly within just 2 to 3 starting letters of most words, which allows fewer characters to appear on screen at any one time, allowing for fewer, but larger keys, which are easier to see and use.

Another advantage of this method over prior art approaches is that the individual tree branches can be built out in a more dynamic and incremental fashion as the user starts typing (thus walking deeper down a particular branch completion path).

Another benefit is this approach allows fewer characters to appear on screen at any one time, allowing for larger key and key label sizes, which are easier to see and use. This is a critical advantage on small virtual keyboard screens.

Another advantage over prior art is that the individual tree branches can be built out in a more dynamic and incremental fashion as the user starts typing, thus walking deeper down a particular branch completion path.

By contrast, as shown in the '233 patent, menus are provided of generally full length terminal word completion endings, similar to conventional word completion methods. So instead of providing menus of suggested completion word endings, only entire words are shown in prior art approaches. This greatly limits the flexibility of the word completion method, and requires too many options than are possible to be displayed efficiently, especially in a space constrained keyboard.

The inventive tree building approach is subtly but importantly different in that it constructs words from shorter length intermediate word fragments, which can potentially take a more keystrokes, but allows for fewer larger keys on average.

For example when the inventive system receives the word "MAIN" (FIG. 1, no. 100), the next key menu may be "F, L, M, S, T" (FIG. 1, no. 102). By contrast, the method disclosed in the '233 patent would show full (terminal fragment) completion options like "TAIN," or "TENANCE," rarely if ever single letter fragments except perhaps at end of words.

The invention allows keys to display word fragments in place of normal single letters, but retaining familiar, relative keyboard layout position based on the initial fragment letter. An example is seen in FIG. 2C, element 112 showing key "ENANCE" in the normal QUERTY layout 'E' key position.

Following the entry of every new letter or fragment, the invention runs a priority determination algorithm to ascertain which potential subsequent letters and fragments (keys) are likely to be most and least relevant and assigns a relative priority value to each key with the goal of providing more space for the most important keys, making them easier to use on small screens.

Keys representing totally irrelevant fragments are hidden or shown de-activated (grayed out in the background), and remaining keys are allowed to expand in size to fill resulting vacant spaces, thus becoming easier to use.

For example in FIG. 1, following entry of letter N, creating MAIN, (100) the letters "F, L, M, S, T" are displayed in menu row 102, become the only relevant next additional letter/key entry options, thus the rest of the keys can be hidden, allowing much more space for relevant keys.

Key size is determined by multiple factors such as the layout format mode, but is generally a function of relative priority, the higher priority the larger the relative size, the lower the priority, the smaller the relative size.

Larger keys also permit the clearer display of significantly more data in each key, such as word fragments, helpful functionality notably lacking in prior art word completion mechanisms.

Figure 3A:
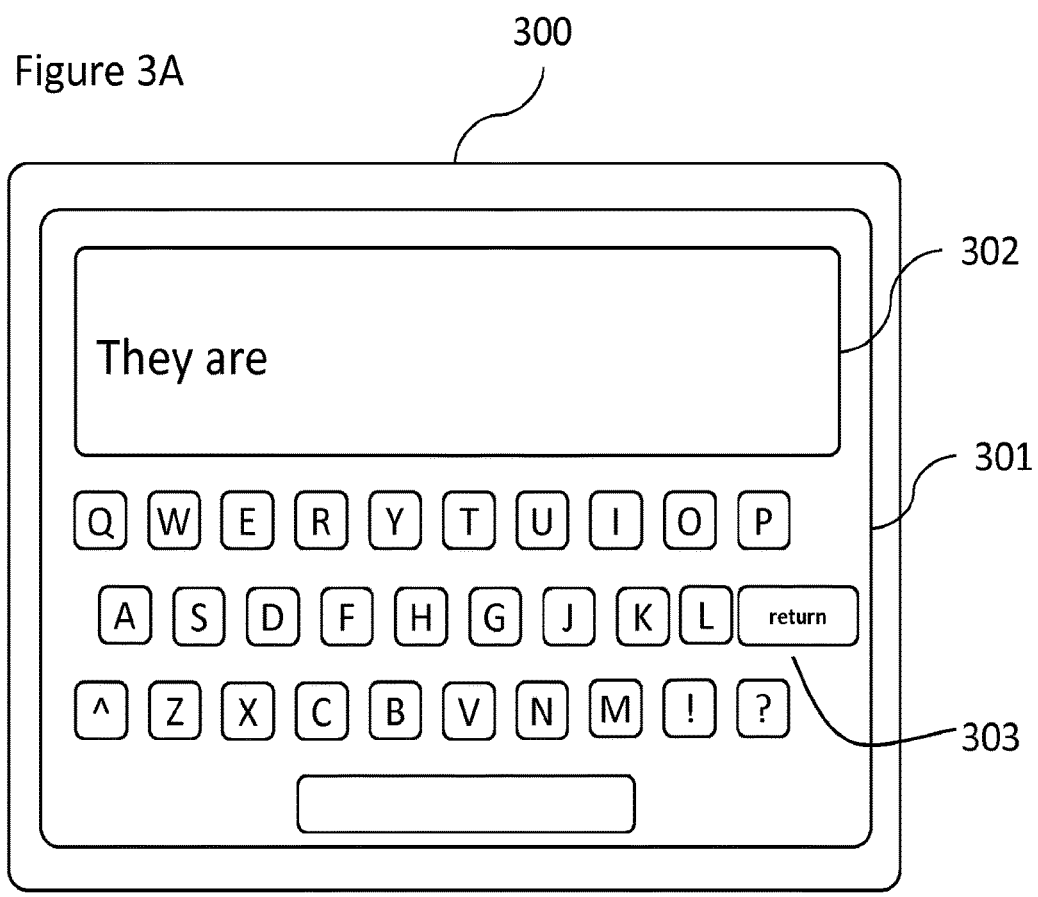
FIG. 3 shows a sequence of typing examples illustrating the variable reduced key set menus.
Figure 3B:
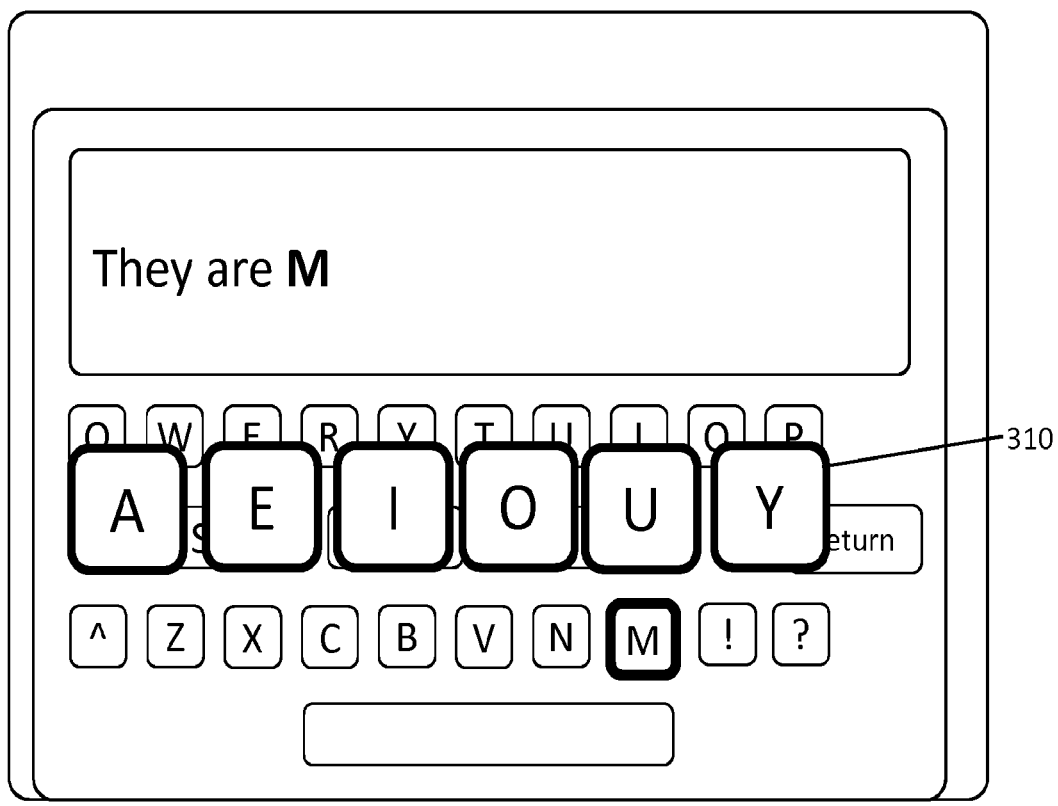
Figure 3C:
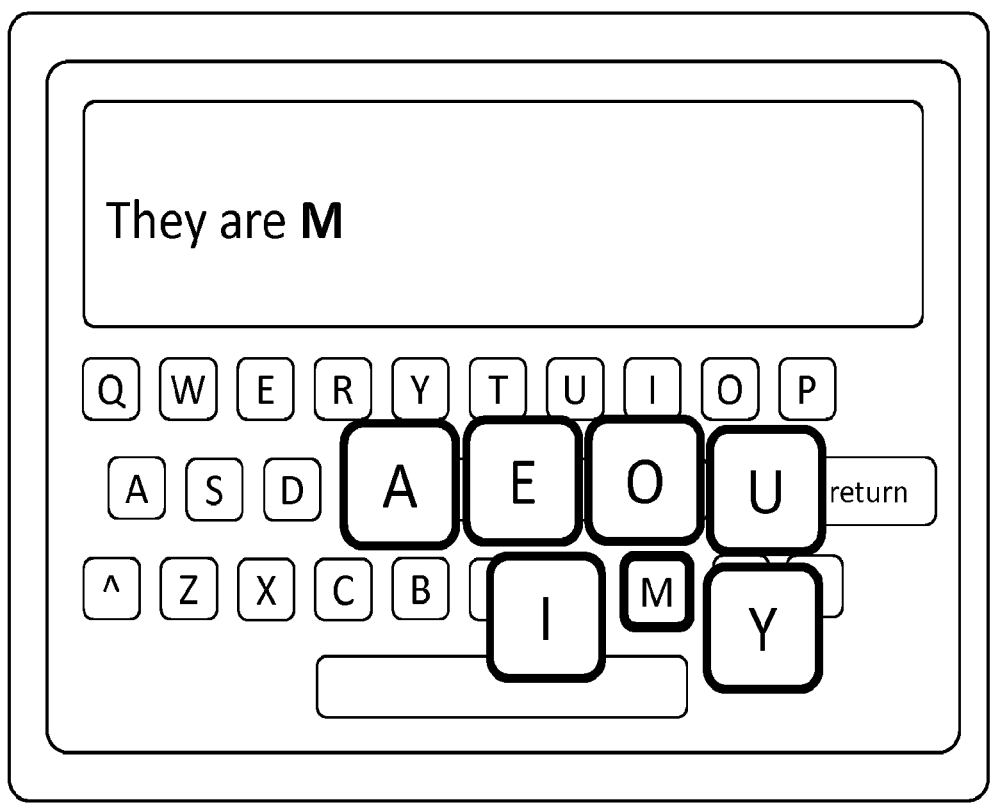
Figure 3D:
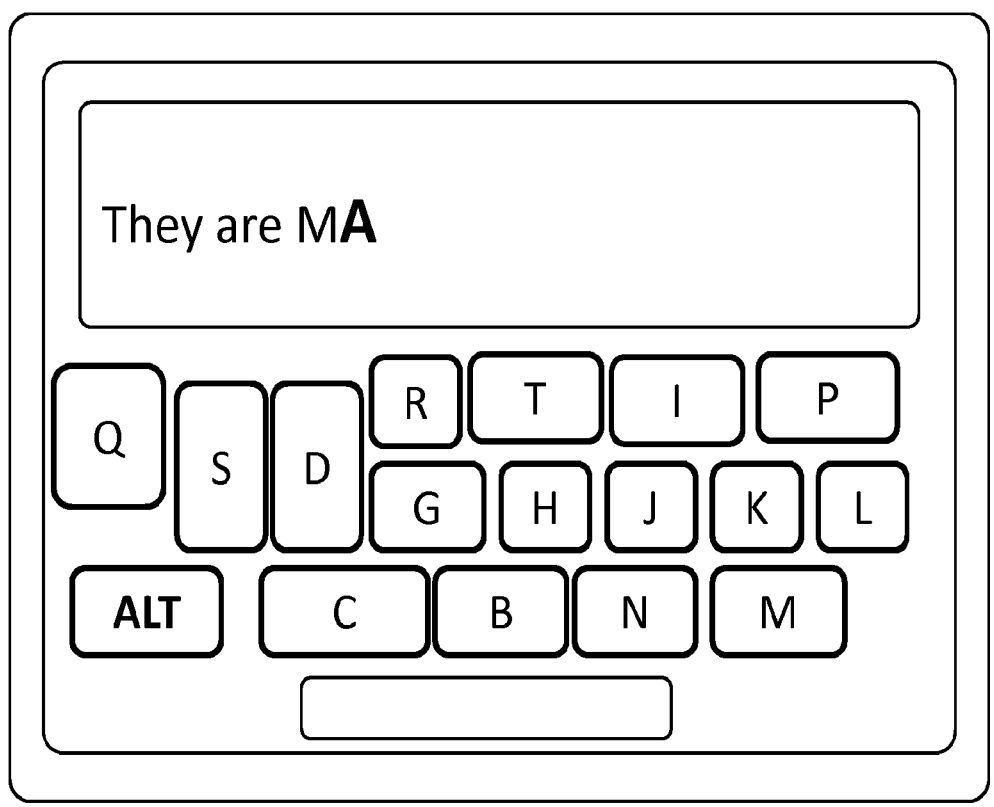
Figure 3E:
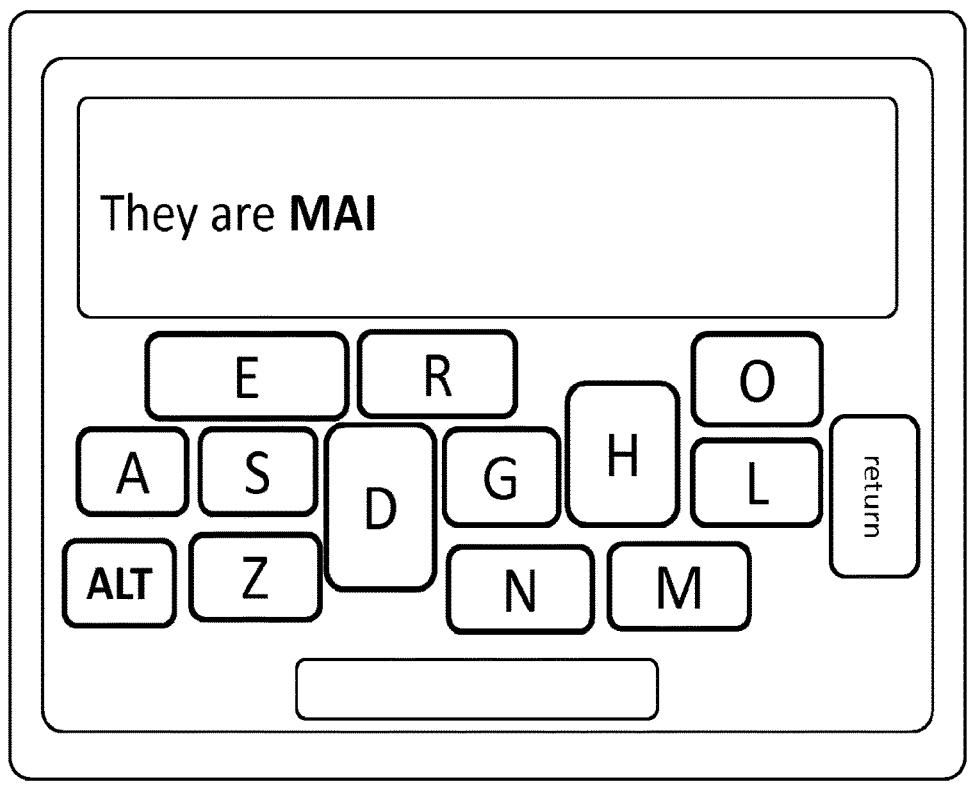
Figure 3F:
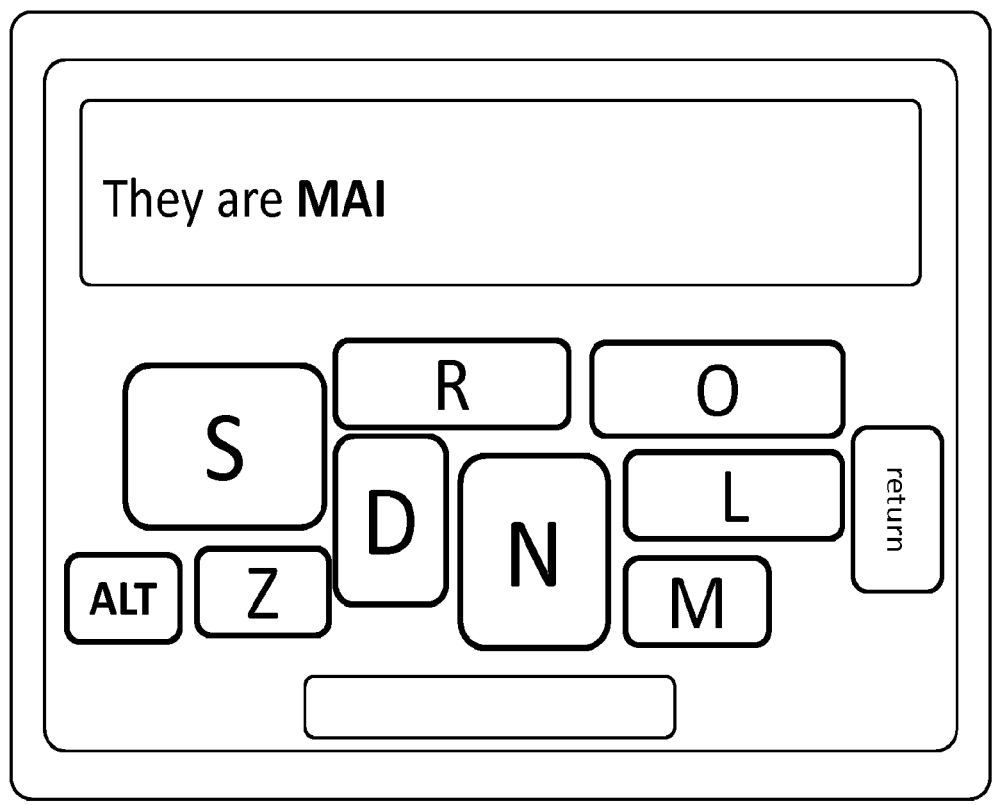
Figure 3G:
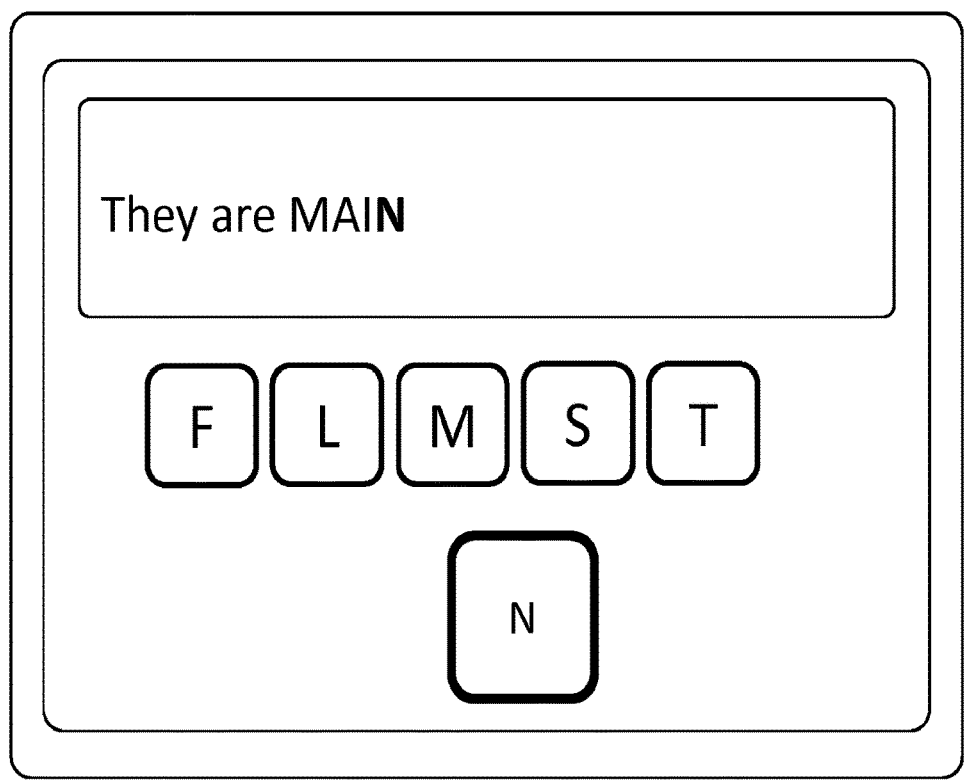
Figure 3H:
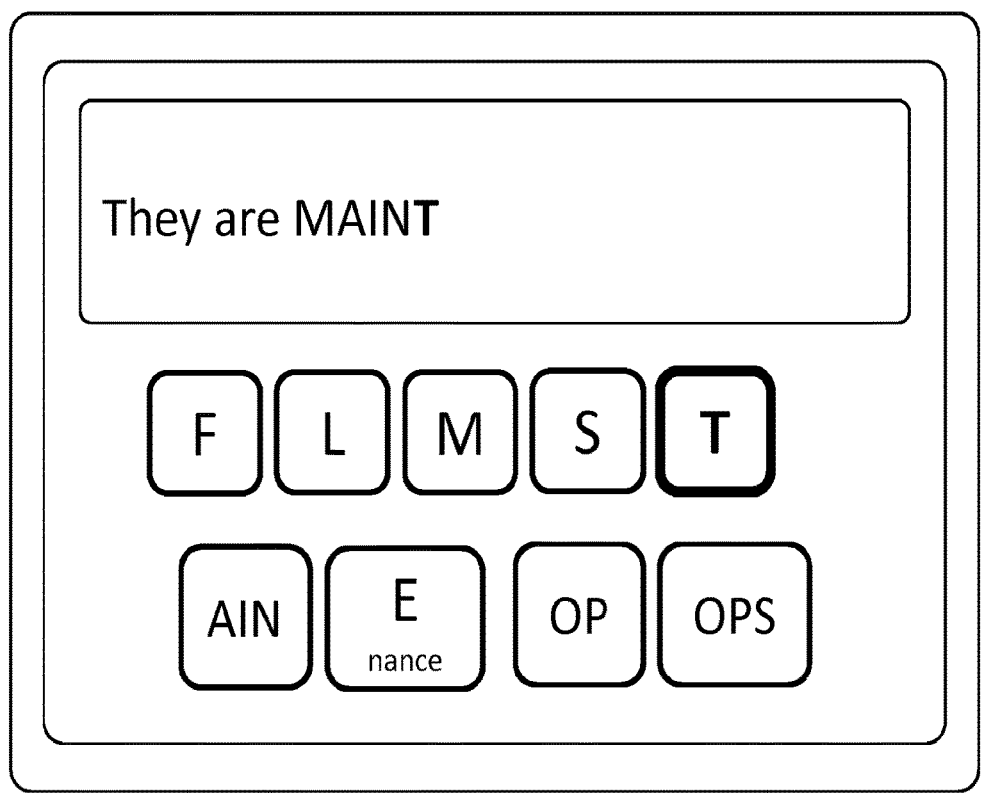

For example in FIG. 1, as letter T is entered creating "MAINT" (110), word fragment "AIN" (element 114) then becomes a possible word fragment ending option; larger keys allow the full display of "AIN" text in normal keys, which can also be positioned in familiar keyboard locations; for example the "AIN" key can be displayed in the normal keyboard layout location of its starting letter 'E', shown in element XX of FIG. 3H.

As the user starts typing a new word, there may little or no context information to help guide the key filtering process, thus a potentially large number of keys may need to be efficiently displayed. Off screen keyboard/keyboard menu display can be navigated into view via scrolling/swiping type gestures, or the use of control keys, etc. But even so, word and letter frequency can be used to control the relative size, position and accessibility of keys.

Determining Letter/Fragment Key Priority

Letter/key priority can be based on multiple factors, such as potential word completion trees, and the most common word, letter frequencies and usage patterns, but can also factor in contextual data from myriad sources, such as GPS location, and building, vehicular or biomechanical device sensors, etc.

Word completion trees can include custom, personalized vocabulary, including shortcuts, slang and abbreviations, etc.

Work completion options can include both single letters and word fragments of variable length, where a word fragment is defined as 1 or more letters.

Determination of Resized Key Shape

Given adequate space, for example due to extremely few keys being shown, all displayed keys will normally expand in size to occupy available space vacated by hidden or de-activated keys.

In some cases keys with varying priorities can share uniform size and also shape; an example is seen the alternating menus of FIG. 3C.

However, if keys have significantly different priorities, higher priority keys can be given relatively larger size and lower priority keys relatively smaller size, particularly when there's limited screen real estate. This is illustrated in FIG. 3F.

A static keyboard layout can constrain the size and shape of larger keys because of the need to retain the original layout relative key positioning. This can cause some keys to expand in size to a more rectangular shape seen in FIG. 3E, the R key has expanded more horizontally resulting in a rectangular shape; the D key has also expanded unevenly, but in downward direction, creating a vertically oriented rectangular shape.

Non-uniform key shapes are permitted to achieve sizing objectives, e.g. more rectangular. The general rule is that keys can expand to fill adjacent vacant spaces; such expansion usually happens in the normal column/row orientation of most keyboards.

Alternating Menus Mode

Alternating menus is a mode that shows two rows of menu keys that appear above and below each other, thus conserving space. This mode is more appropriate when key menus have a relatively similar number of keys which fit comfortably into a single onscreen row, a circumstance more common when editing closer to the end of a word.

Menu and submenu display can occur in alternating directions, with a repeating vertical pattern of up/down style, or a side to side left/right style (exact pattern determined by the first direction of menu display). This allows the user to navigate into indefinitely deep submenu levels while using a maximum screen area equivalent to just two submenus, since the menu screen space is constantly reused.

Spring Loaded Alternating Menus

Spring loaded functionality works very well as a driver of alternating menus as it allows next menus to open when a menu key region is not selected, but merely touch activated, thus providing extremely rapid navigation through a complex branching tree of options, making it well suited to word completion trees.

It also provides rapid "look ahead" previewing of possible next menu key options without requiring specific key selection, which is a huge help with word completion. Another advantage is that the user doesn't need to move a finger or pointer device off the screen at any stage.

Another big advantage is that the 'bread crumbs' of the user's pointer navigation path through the key menus can be used to automatically enter text associated with each key thus not requiring explicit key selection. This can be extremely helpful in many tricky situations, for example single hand device usage, etc.

Combining Multiple Keyboard Menu Styles and Modes

This invention permits the use of multiple keyboard menu styles that can change mid-word literally with every keystroke.

For example in FIG. 3B, the user begins typing the word "MAINTAINING" starting with the letter 'M', triggering display of vowel menu key set "A,E,I,O,U,Y", the only word completion fragments that generally apply in this situation.

Next a sizing algorithm determines that there is adequate space and common enough priority for all vowel keys to be resized in larger uniform shape, with keys positioned in row fashion above and adjacent to the just triggered 'M' key, shown in FIG. 3B (310).

In an alternate menu embodiment, the layout algorithm produces a more circular layout pattern of "A,E,I,O,U,Y" in FIG. 3C, designed to bring the next key menu options closer to the previously triggered 'M' key, which can reduce pointer travel distance to the next key selection.

Note how the vowel key menus are displayed above a de-activated full QWERTY keyboard.

Next the user selects the letter 'A', which triggers a new cycle of prioritization, sizing and layout algorithms, resulting the in the QWERTY compatible keyboard menu seen in FIG. 3D, which combines with key hiding with key re-sizing, with many keys morphing from uniform square to non-uniform rectangular shapes.

Next the user selects the "I" key, creating "MAI", resulting in the new key menu set seen in FIG. 3E.

FIG. 3F optionally shows a more limited key set for "MAI", hiding very low priority keys, available however via an "ALT" control key, resulting in much larger keys, with the "S, N" being good examples.

Next the user selects the "N" key, creating "MAIN" in FIG. 3G, then displaying the "F,L,M,S,T" key menu. Because subsequent key menus are so small, the system can switch to an alternating menu mode, including spring loaded action, illustrated in FIG. 3H.

Alternating Menus Example

Figure 3I:
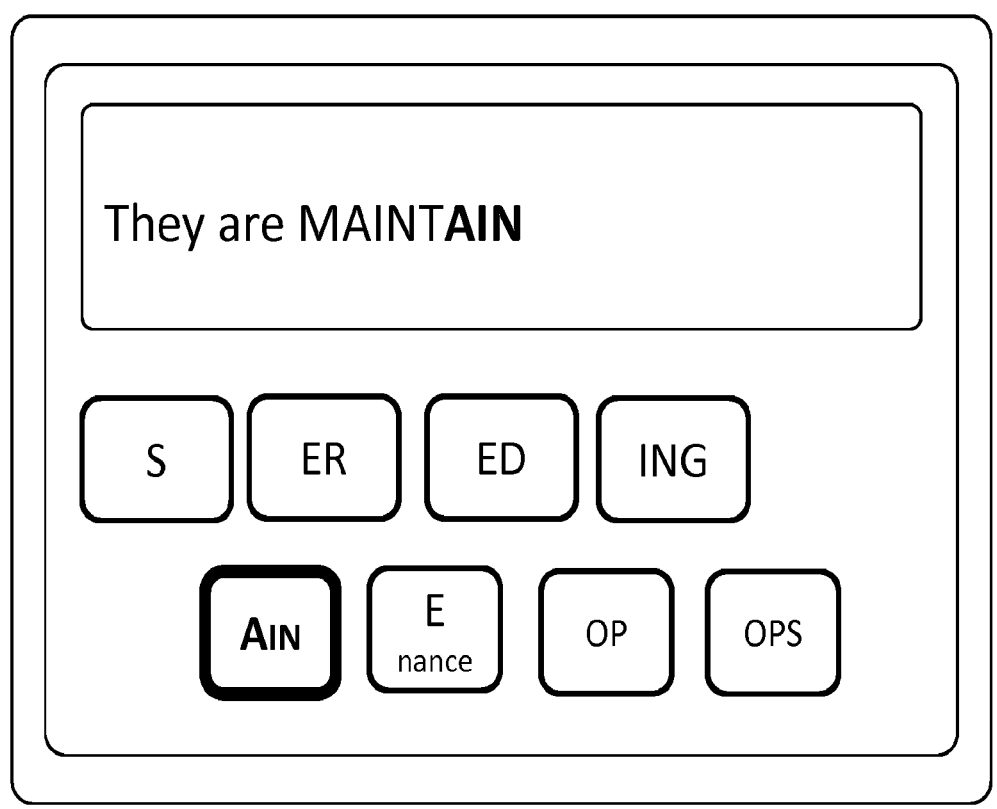

FIGS. 3G, 3H, and 3I illustrate a mechanism where menu selections are shown bolded.

In FIG. 3G, the "N" is selected appending "N" to end of "MAI" forming word fragment "MAIN" in the editing display area, which triggers display of the next word completion menu keys, "F,L,M,S,T", displayed in alphabetical order from left to right, making it much easier to find the next key.

FIG. 3H shows selection of "T", building "MAINT", then displaying the next menu key set "AIN, Enance, OP, OPS" in a downward alternating direction. To conserve space, "Enance" is shown with a larger "E" and smaller following letters. Note how word fragment keys are display in alphabetical order.

FIG. 3I shows a similar pattern with the selection of "AIN", hiding the "F,L,M,S,T" menu, then displaying the child menu key options of the "AIN" fragment, "S, ER, ED, ING".

Dynamic Key Relative Sizing

The invention circumstantially makes the most relevant letter/key options easier to use by temporarily increasing relative size and/or highlighting, while optionally de-emphasizing less relevant keys via any combination of decreased relative size, disabling, un-highlighting, graying out, or hiding, etc.

If the user prefers a static display mode, e.g. QUERTY, the invention requires all resized keys to remain positioned as close as possible to the user's normal keyboard layout location, thus retaining continuity with a familiar layout, eliminating or substantially reducing learning curves.

Figure 2A:
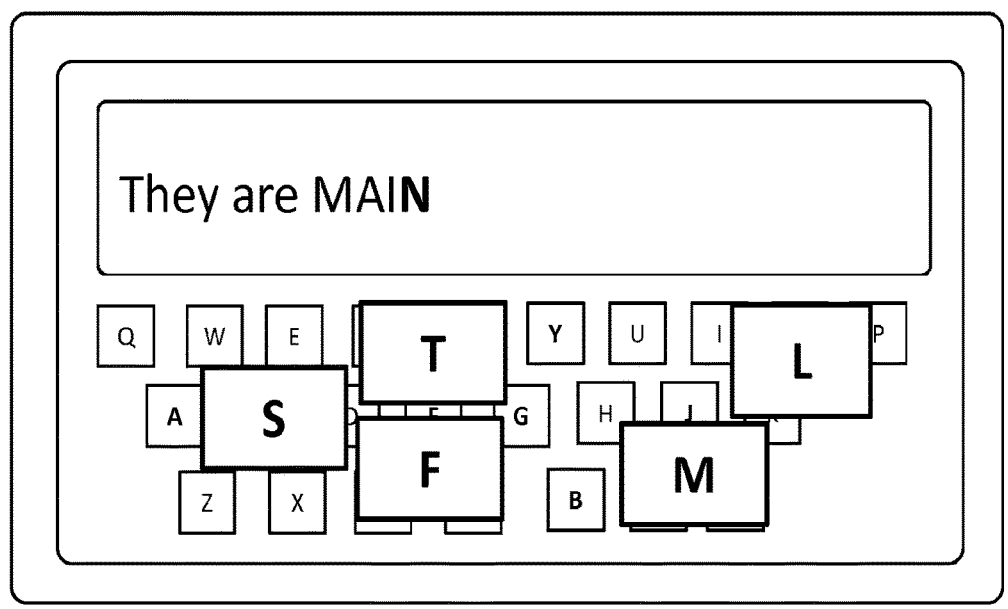
FIG. 2 shows variable size keys resized in their approximately normal QWERTY location.

FIG. 2A illustrates how the typing of "main" dynamically results in larger, highlighted "F, L, M, S, T" keys, which retain their relative QWERTY keyboard locations, particularly relative to each other; and how they overlap and in some cases hide irrelevant keys.

Figure 2B:
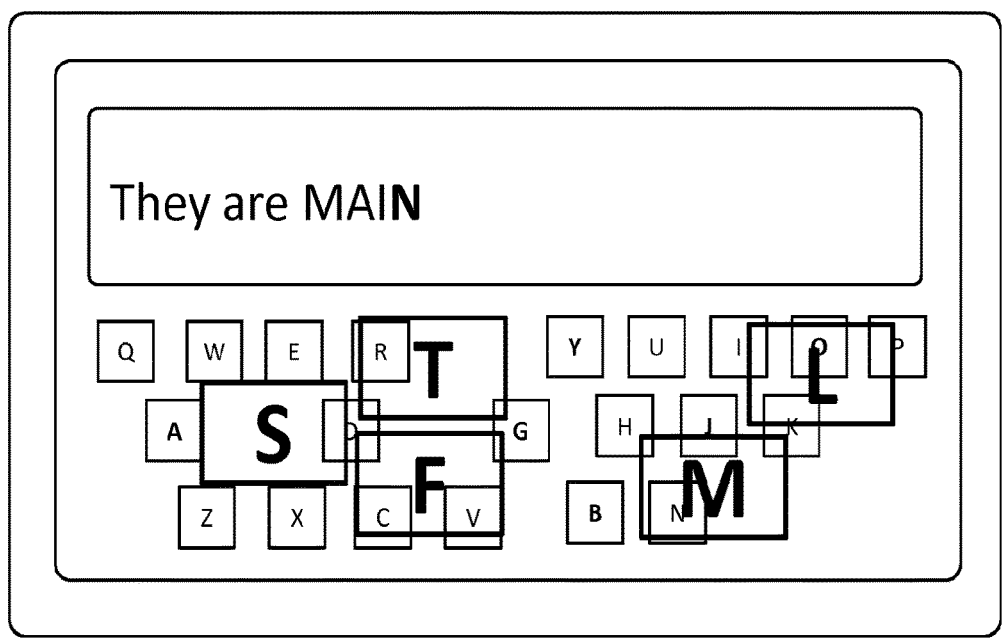
Figure 2C:
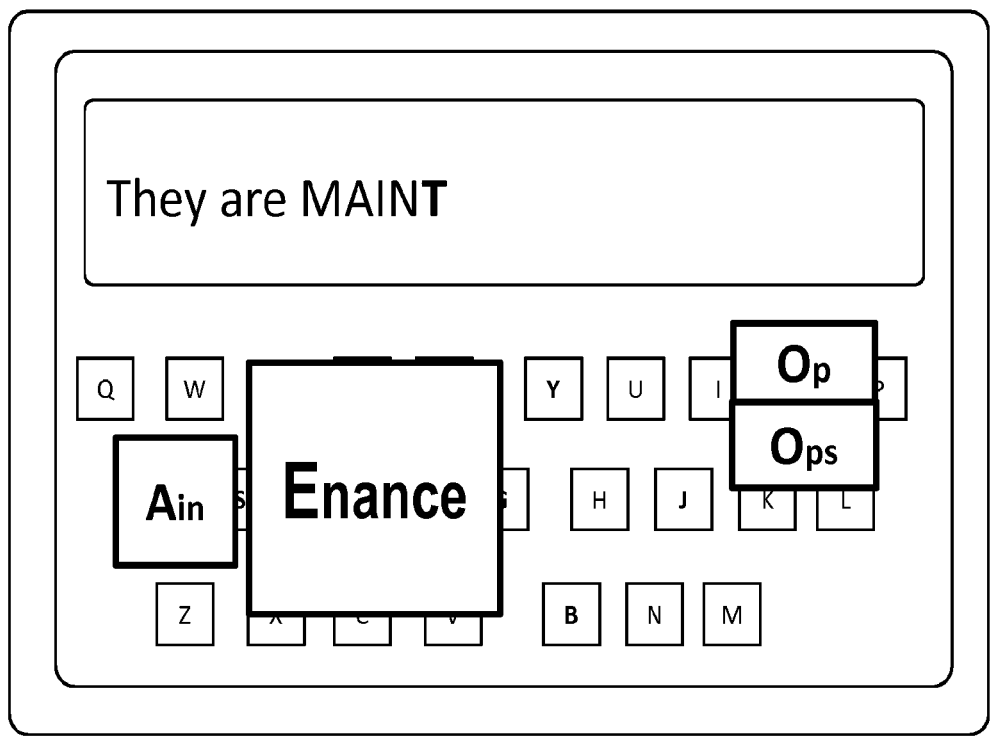

FIG. 2B illustrates how overlapped keys underneath can also be displayed via translucence to further help retain layout familiarity and thus guide the user.

Space permitting, keys can display any combination of relevant single letters and/or word fragments, including just partial fragments, or even entire complete words.

For example, in FIG. 2C, after typing "maint" the possible word fragment completions, "ain", "enance", "op", are displayed as key labels.

Word fragments are always positioned in the same approximate normal keyboard locations as their optionally highlighted starting letter; for example in FIG. 2C, "ain" is displayed approximately where the "A" key is normally positioned, with the letter A capitalized for highlight purposes.

If a letter has multiple associated word fragment completions, they can be displayed using multiple keys or via popup menu.

If a letter has multiple associated word fragment completions, they can be displayed, space permitting, using multiple contiguous keys, illustrated in FIG. 2C Starting letter highlighting can take any form, for example font type, style, size, color, graphic embellishments, etc.

Overlapped keys can, if desired, remain selectable by gestures such as longer and/or harder (variable pressure and/or duration) key press, or sliding motion into the overlapped key region.

Within the limited subset of word completion choices, relative sizing/highlighting can also be applied, reflecting the most and least likely choices, thus helping guide the user. For example in FIG. 28, the most likely choice "enance" has a much larger relative key size and font, compared to the other completion key options.

Circular Display Formats

The system can optionally display each key menu in circular layout formats, containing a center area displaying the currently selected key, surrounded outside by the center selection's next key menu options, arranged concentrically radiating out from the center.

Figure 4A:
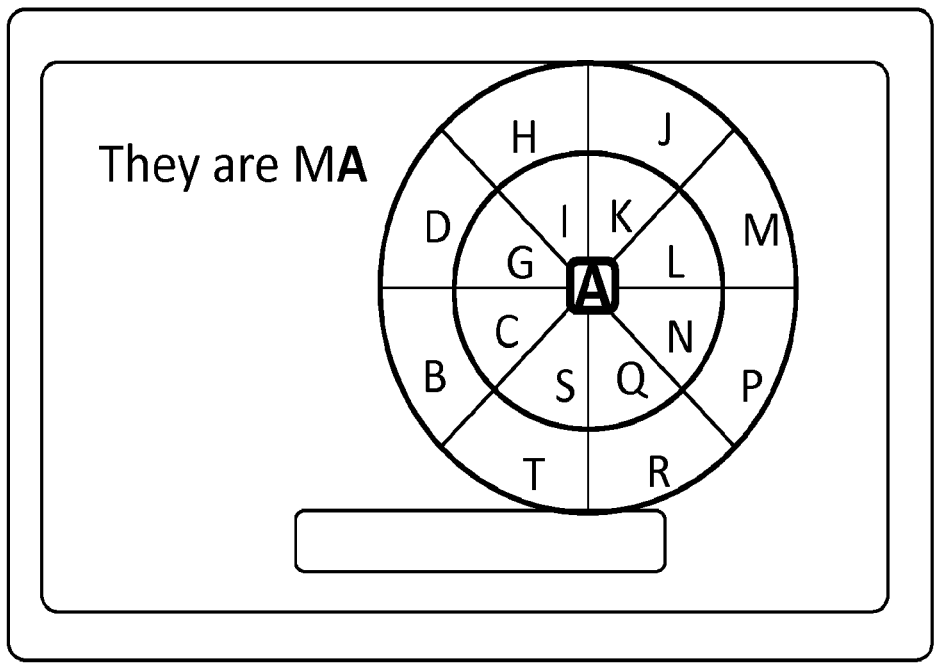
FIG. 4 shows circular menu formats.
Figure 4B:
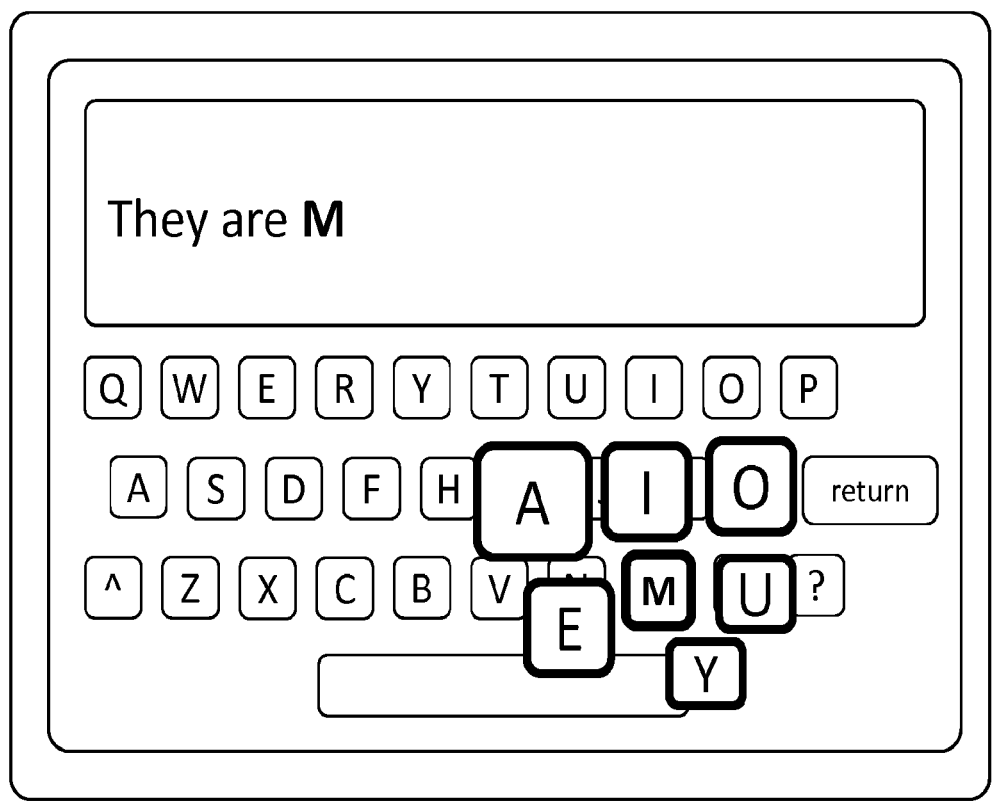
Figure 4C:
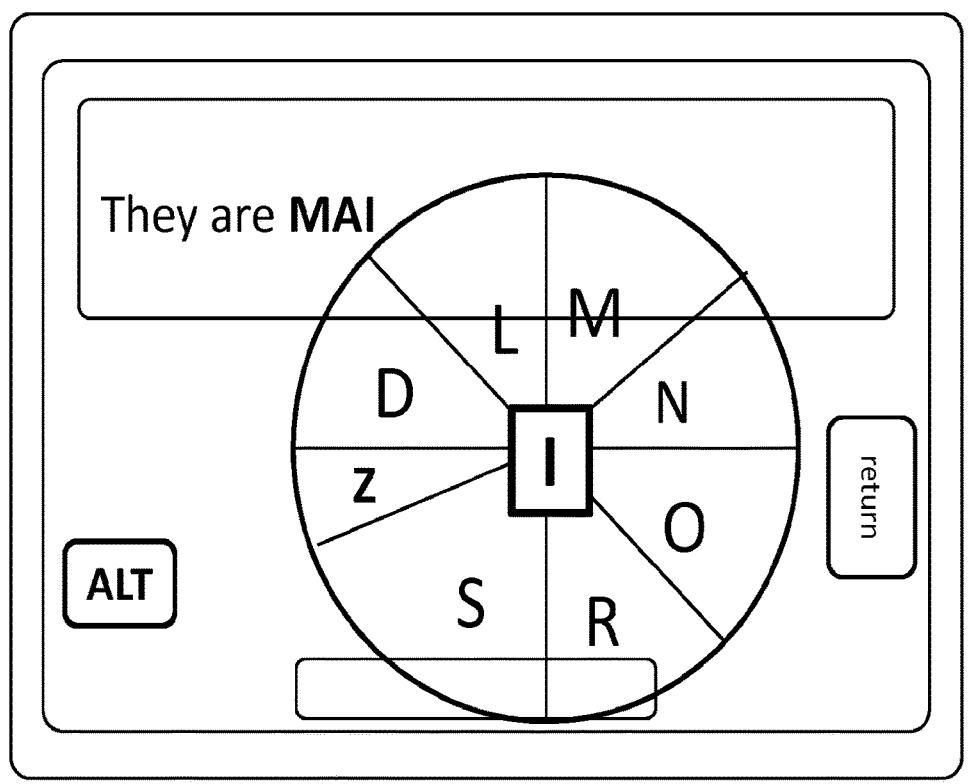

Layouts can be in concentric pie slice format (FIGS. 4A and 4C), or just traditional keys (FIG. 4B)

Traditional key press type selection can be used, or a semi spring loaded alternating menu style is possible.

In non-traditional mode, user can select the next menu item by moving the pointer from the center into a key selection area. Selection can occurs only after the pointer has moved outwards far enough to remove any possible ambiguity of choice when a heavily populated menu selection is presented, or selection can involve a gesture like longer key press or a small pointer movement pattern, etc.

The center area displays the menu item currently selected—whenever the pointer is over the center, the key regions display the selected items child branch menu items.

For example if the starting word fragment is "main" and the user selects "T" as the next letter, the center will display "T" and the outer pie slices will display the menu choices of "AIN, ENANCE, OP, OPS."

Normally each key area region represents a single menu item; however if there are more menu items than can easily, conveniently fit, then each menu item can be represented as buttons arranged in either concentric circular rows surrounding the center area, or in spoke fashion.

The more likely high priority key fragments will normally be placed in the innermost rows or spoke locations.

Buttons can be irregular in shape and size to better accommodate and optimize varying button label requirements, and also take advantage of greater space availability, for example farther away from the center.

FIGS. 4A to 4G illustrate circular menu operations

Figure 4D:
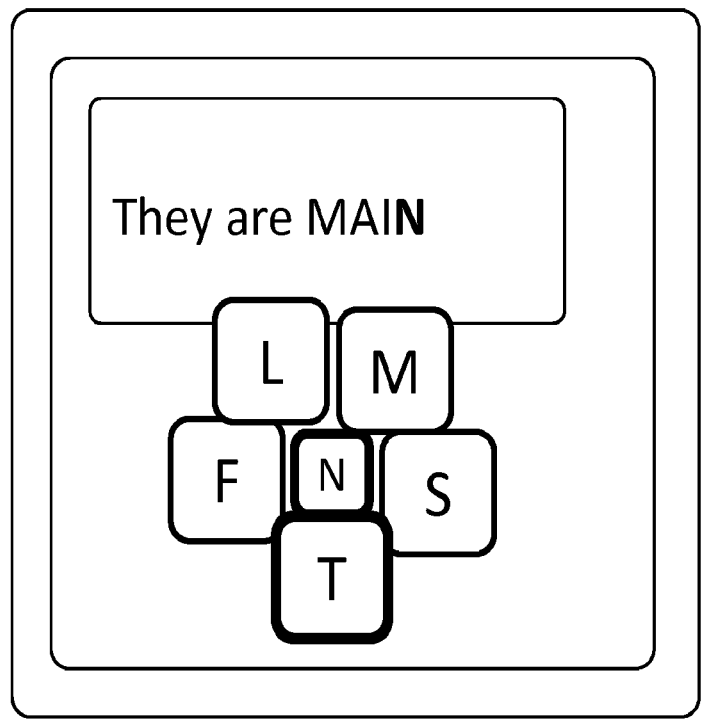
Figure 4E:
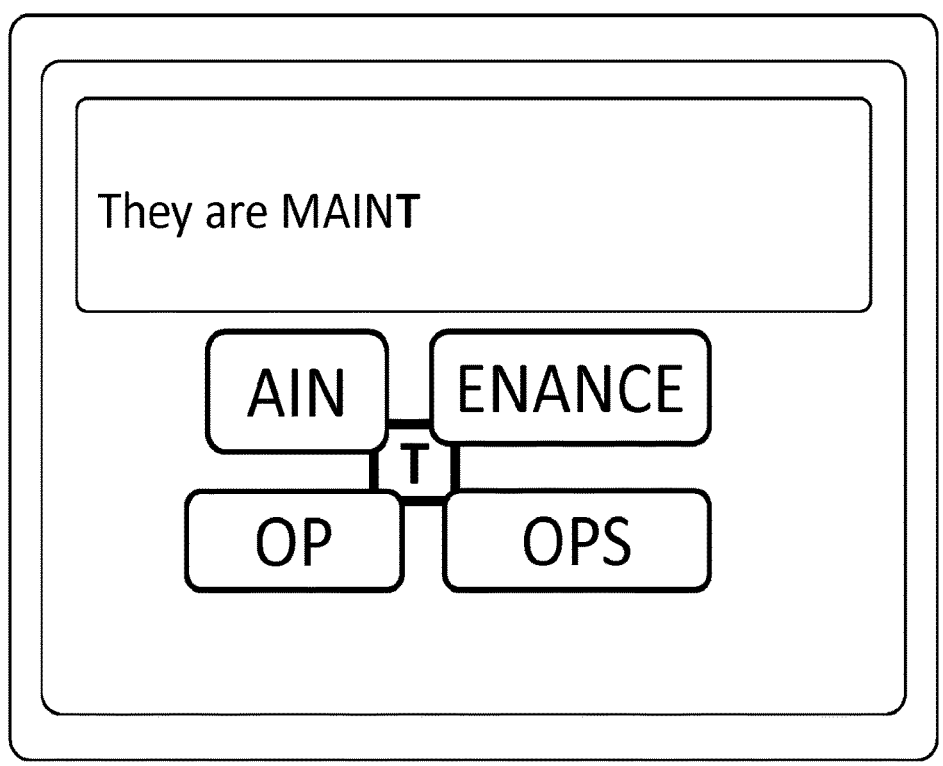

FIG. 4D shows keyboard selection of "N", triggering a display of keys arranged in a circular fashion, showing the new word fragment "MAIN", also showing newly selected "N" in center, surrounded by the next menu of possible word completion options;

FIG. 4E also shows the next selected menu item "T" in bold, triggering a new menu of word fragments in a circular arrangement around the central letter T. In a spring loaded menu embodiment, "T" is selected by sliding the pointer from center ("N") into "T" and back into the center again to complete. Alternatively, "T" can be simply tapped or selected by pointer location pause, or mouse click.

Figure 4F:
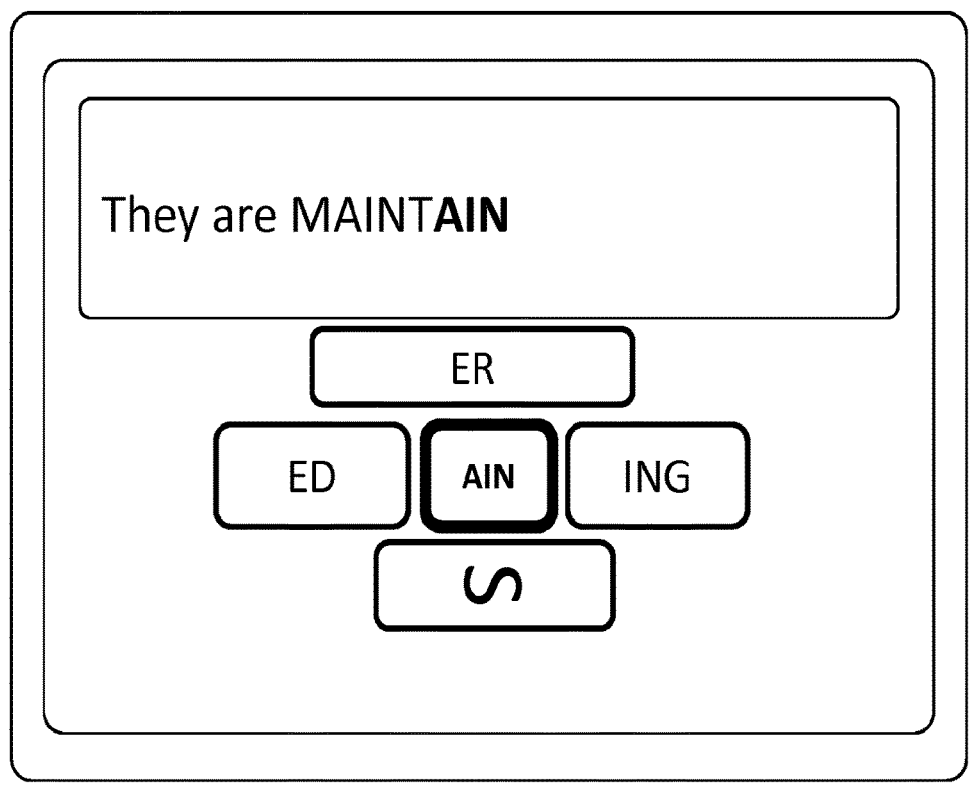
Figure 4G:
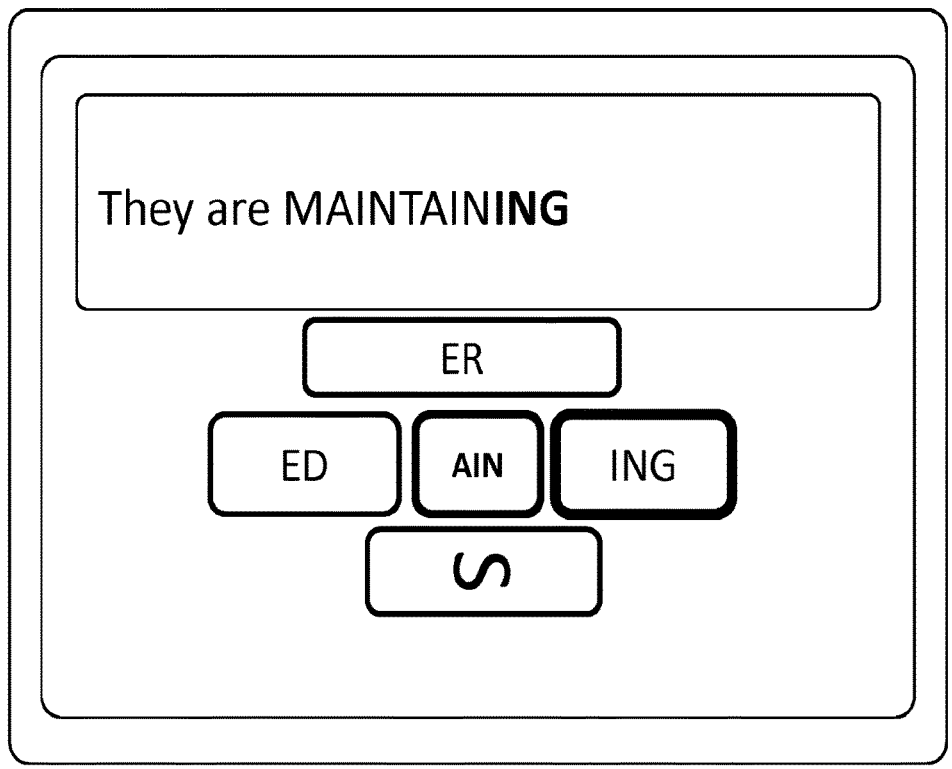

FIGS. 4F and 4G continue the same pattern resulting in the terminal word completion of "MAINTAINING".

Keyboard Overlap with Edit Content

Tiny screens often lack space for display of more than a single row of keys large enough to be truly usable. This invention solves this problem by allowing keyboards and keyboard menus to temporarily overlap and float on top of text display content editing areas.

Figure 6:
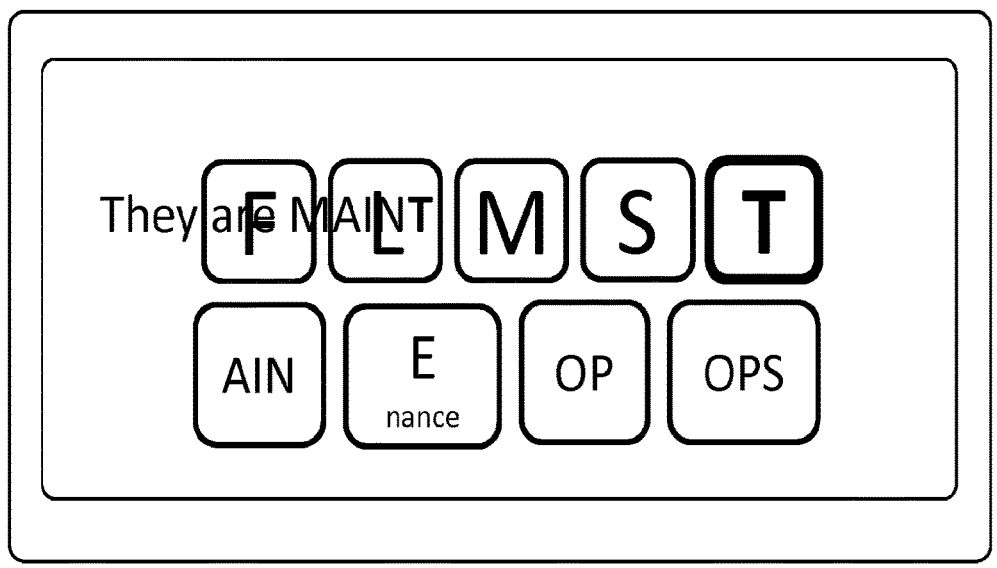
FIG. 6 shows key menus overlapping with edit content.

For example either one or both rows of alternating menus can overlap edit content areas. An example is illustrated in FIG. 6.

Single Row Keyboard Menus

Figure 5A:
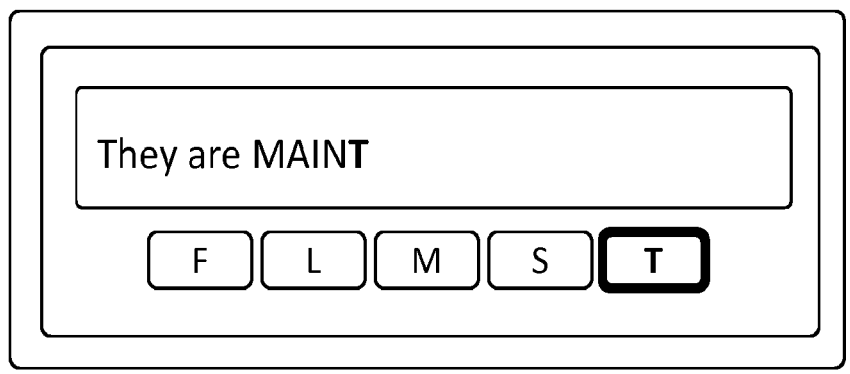
FIG. 5 shows single row mode of operation.
Figure 5B:
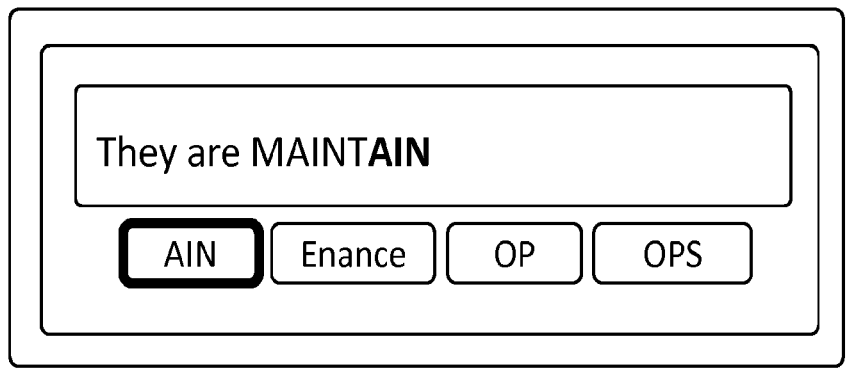
Figure 5C:
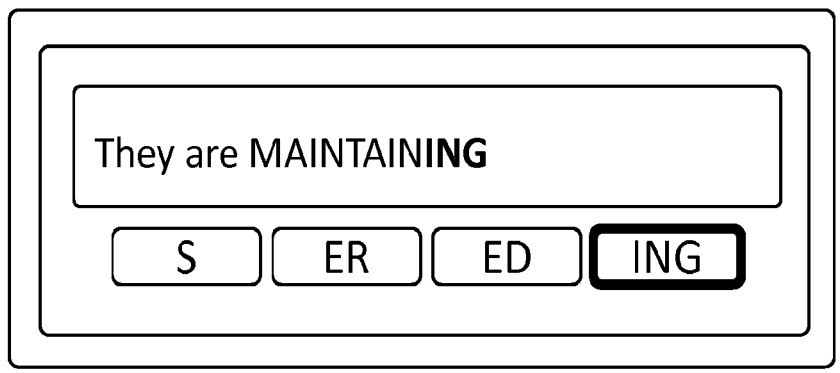

Sequential word completion menus can also be shown in single row mode if extremely limited space. When a key is selected, the current menu row disappears and the next row menu sequence appears in its place—this can be accomplished with slide/scroll/dissolve effects if desired. For example in FIG. 5A, key 'T' is selected, creating "MAINT", next causing key menu "F, L, M, S, T" to be replaced by key menu "AIN, ENANCE, OP, OPS", seen in FIG. 5B. Next "AIN" is selected, creating "MAINTAIN", triggering replacement of current key menu with "S, ER, ED, ING" in FIG. 5C.

The invention claimed is:

1. A user interface for word completion during text input by a user on a device comprising:
   a device electronically connected to a processor for providing an interface including a computer generated means; said device functionally connected to a display screen capable of displaying a virtual keyboard wherein each key comprises a selectable region of a screen representing a sequence of one or more letters;
   wherein said user interface provides a computer-generated means for a user to complete the word completion using the virtual keyboard and selecting keys with a pointer, the computer-generated means comprising interfacing with the user in the following sequence:
   a. the interface provides the computer-generated means for a user to select an initial starting word fragment from one key on the displayed virtual keyboard corresponding to a starting word fragment of a word to be completed by text input;
   b. based on the previously selected key, using a word completion system to determine a set of probable words; further determining a hierarchical tree structure of word fragments for the construction of the previously determined set of probable words;
   c. determining a set of word fragments required to traverse from a previously-selected word fragment to deeper branches of the hierarchical tree structure determined in step b, including at least one non-terminal word fragment with three or more letters;
   d. the interface presenting the user the visual representation of a keyboard rearranged with a set of keys representing at least one word fragment with three or more letters from the set of word fragments in a way that reduces the total number of keys presented to the user from the keyboard layout of step a; with programming to adjust the appearance of said set of keys into shapes dynamically variable in size, shape, or position on the virtual keyboard based on priority and availability of adjacent space to facilitate the ease of use of the highest priority keys;

e. providing programming allowing for the user to select a key corresponding to the word fragment required to construct the word desired to be input by text;

f. the interface recognizing the key selected by the user and the word fragment represented by the selected key and adding the selected word fragment as a suffix of the previously-selected word fragment of the word in process of completion;

g. repeating steps b-f until the word has been completed.

2. The user interface of claim 1, wherein the dynamically shaped keys expand to fill available adjacent space while remaining anchored in a relatively familiar location based on the user's traditional keyboard layout.

3. The user interface of claim 1, wherein the dynamically shaped keys are presented to the user and arranged in a pattern generally surrounding a central point.

4. The user interface of claim 3, wherein the last selected key is displayed in approximately the position of the central point.

5. The user interface of claim 3, wherein dynamically shaped keys are arranged concentrically radiating out from the central point.

6. The user interface of claim 3, wherein dynamically shaped keys vary in shapes selected from generally square, generally rectangular, generally triangular, generally trapezoid, generally circular shapes, generally bisections of a circle and combinations thereof.

7. The user interface of claim 3, wherein the dynamically shaped keys are arranged in radial divisions of a ring surrounding the central point.

8. The user interface of claim 1, wherein the responsive keys vary size based on priority.

9. The user interface of claim 1, wherein further comprising a spring loaded menu:

comprising a means for displaying menu items in response to a pointer mechanism entering a display trigger zone for said menu, and hiding said menu items when the pointer exits said display trigger zone, wherein no selection of a menu is made by such pointer mechanism entering said display trigger zone; wherein the responsive keys are displayed in a spring loaded menu.

* * * * *